Aug. 24, 1948.  J. W. LITTLE  2,447,983
SHRINKABLE CONTAINER CLOSURE
Filed May 25, 1944
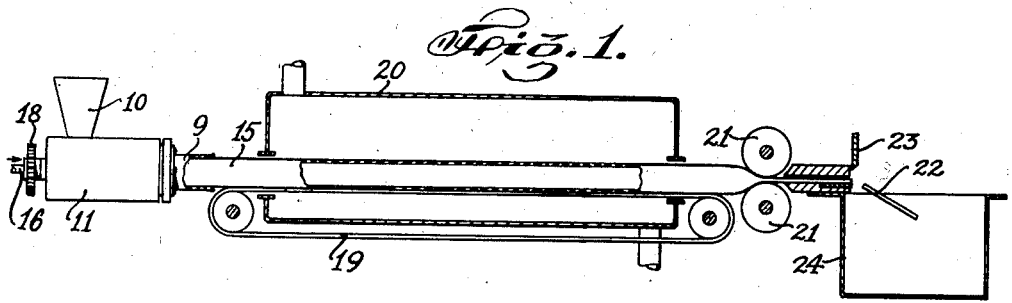
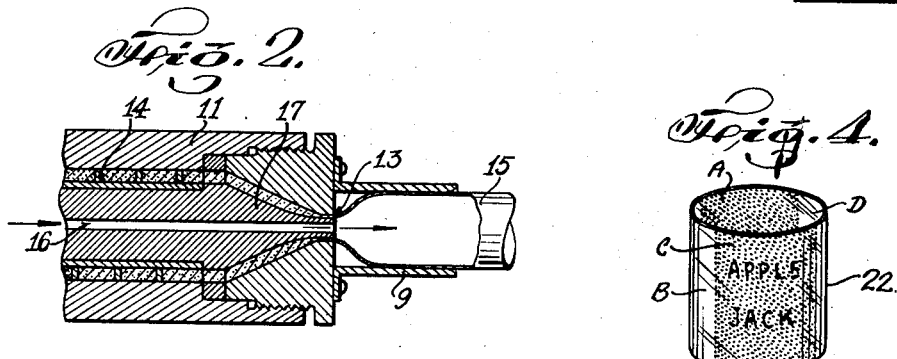
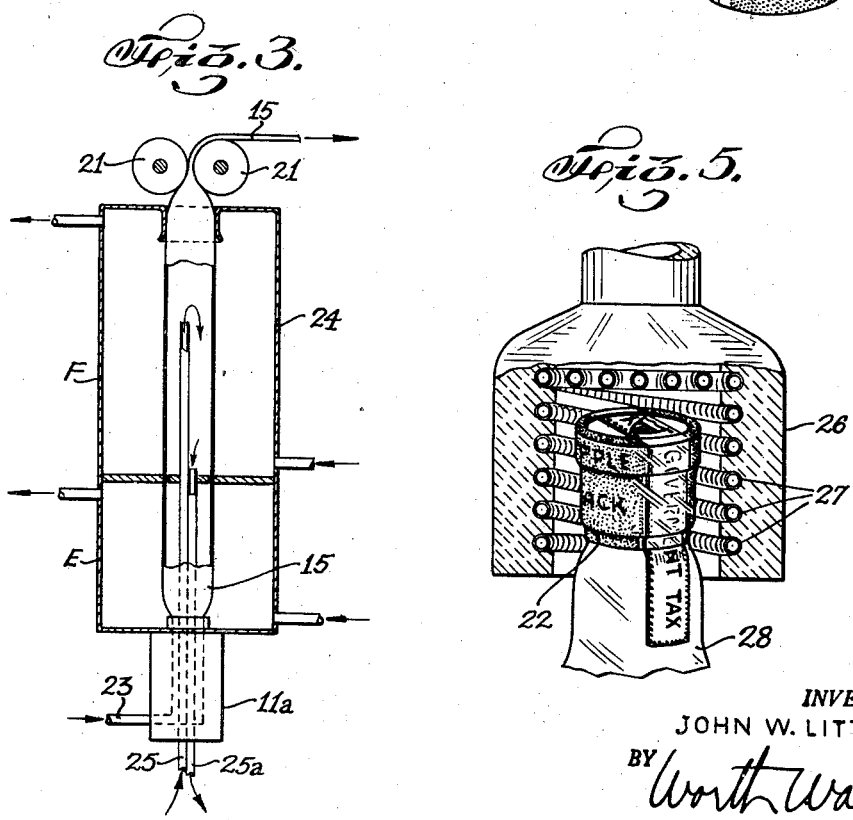
INVENTOR.
JOHN W. LITTLE
BY *Worth Wade*
ATTORNEY Patented Aug. 24, 1948

2,447,983

UNITED STATES PATENT OFFICE 2,447,983

SHRINKABLE CONTAINER CLOSURE

John W. Little, Scarsdale, N. Y., assignor, by mesne assignments, to American Viscose Corporation, Wilmington, Del., a corporation of Delaware Application May 25, 1944, Serial No. 537,219

6 Claims. (Cl. 215—38)

This invention relates in general to shrinkable closures for containers, and includes correlated improvements designed to enhance the appearance, structure and utility of such closures.

It is customary in the bottling of alcoholic beverages, perfumes, and liquids of various types to place over the stopper or bottle cap a secondary shrinkable closure. Heretofore, such closures have been formed of various hydrophilic materials, in particular regenerated cellulose. Such closures are customarily made from viscose and are usually shipped wet and applied to the bottle in the wet gel state after which they are allowed to dry whereupon they shrink tightly over the primary bottle closure. The shipping of such regenerated cellulose closures in the wet condition is expensive since large quantities of water must be shipped. It is also necessary to add a preservative to the water in order to prevent the growth of mould on such closures. Finally, hydrophilic closures as a class have a serious disadvantage in that they may be readily removed from the bottle merely by again soaking the closure in water whereupon it swells sufficiently to be slipped off.

Accordingly, it is a general object of the present invention to overcome the disadvantages of prior soluble container closures formed of hydrophilic materials by providing a closure which is hydrophobic in character.

It is another object of the invention to provide a shrinkable container closure which may be shipped in a dry condition and yet be capable of shrinking tightly about the bottle after application.

It is a specific object of the invention to provide a shrinkable container closure which after having shrunk on a bottle is incapable of being removed without tearing.

Other objects of the invention will in part be obvious and will in part appear hereinafter.

According to the present invention, there is provided a shrinkable container closure by extruding a thermoplastic resin composition, preferably comprising a thermosetting resin in the thermoplastic state, stretching the tubing transversely, cooling the stretched structure of the tubing, and severing the tubing into short sections to form shrinkable closure bands. The bands thus produced may be printed dry and shipped dry and applied to the bottle in a dry condition. The dry closure, as a result of the transverse stretching, may be shrunk upon the bottle by heating the closure sufficiently to cause it to shrink and preferably simultaneously, or thereafter, heating the resin closure sufficiently to convert the thermosetting resin into the heat-hardened infusible state whereupon the shrunk condition of the closure will be rendered permanent so that the closure cannot be removed without tearing it.

The invention, accordingly, comprises the article possessing the features, properties, and the relation of elements, which are exemplified in the following detailed disclosure, and the scope of the invention will be indicated in the claims.

For a more complete understanding of the nature and objects of the invention, reference should be had to the accompanying drawing in which Fig. 1 is a side elevation, partly in section, of suitable means for forming the container closures of the invention;

Fig. 2 is a side elevation, in section, of a portion of the extrusion head employed in the apparatus of Fig. 1;

Fig. 3 is a side elevation partly in section of a suitable means for forming the container closures of the invention;

Fig. 4 is a perspective view of one embodiment of the container closure of the invention; and Fig. 5 is a side elevation, partly in section, of suitable means for shrinking the closures of the invention.

The resin composition from which the closure of the present invention is formed comprises any thermoplastic film-forming synthetic resin, but preferably the closures are formed from vinyl polymers because pre-stretched closures formed from such polymers have the chaacteristic of shrinking to a substantial extent when heated. Among the vinyl polymers which may be employed are, for example, polymers of vinyl acetate, vinyl chloride, vinylidene chloride, after-chlorinated vinyl polymers, such as the polyvinyl formals, acetals, and butyrals, polystyrene, resins formed from esters of acrylic acid and methacrylic acid, and the like; copolymers of vinyl chloride and vinyl acetate, copolymers of vinylidene chloride and vinyl chloride, copolymers of vinyl halide and an acrylic acid derivative, and copolymers of a vinyl compound and styrol; resins formed from dicarboxylic acids and diamines (nylon type).

In the now preferred embodiment there is added to the thermoplastic resin composition a thermosetting resin in the thermoplastic state so as to produce a closure which is capable of being set in its shrunk condition. Among the thermosetting resins which may be employed there may be mentioned, by way of example, alkyd resins, drying-oil-modified alkyd resins, sulfonamide aldehyde resins, phenol-aldehyde resins, urea-aldehyde resins, urea-aldehyde-alcohol ether resins, melamine-aldehyde resins, and the like, and mixtures of thermosetting resins. Also, there may be used a resin composition containing a minor proportion of the thermoplastic cellulose derivative, such, for example, as the organic solvent-soluble cellulose esters, such as cellulose acetate, cellulose butyrate, nitrocellulose, also alkyl-, carboxy-alkyl, and hydroxy-alkyl cellulose ethers of the types which are soluble in organic solvents, and the mixed ether-esters of cellulose.

In the now preferred embodiment the thermosetting resin employed is just sufficient to cause the thermoplastic resin composition to be heat-hardenable but insufficient to destroy its film-forming properties or flexibility. In general, the thermosetting resin may comprise from 25% to 75% by weight of the resin composition and a ratio of 2 parts of thermoplastic resin to 1 part of thermosetting resin is a desirable composition. When a thermosetting resin is employed, there is added to the composition a suitable latent catalyst, the catalyst being selected with regard to the particular thermosetting resin employed. For acid-curing thermosetting resins there may be used, for example, salts of chloracetic acid; ammonium salts of strong acids; ammonium thiocyanate; p-toluene sulfamic acid, and the like. For the alkali-curing thermosetting resins there may be used sodium carbonate, ammonia, alkali sulphites, cupric hydroxide, aluminum hydroxide, pyridine, sodium cyanide, guanidine carbonate, pyridine dithiocarbamate, and the like.

Thermosetting resins when in the thermoplastic state are preferably used with a suitable amount of an organic plasticizer. Suitable plasticizers are, for example, dibutyl sebacate, dibutyl phthalate, tricresyl phosphate, dicyclohexyl phthalate, methyl cellosolve acetyl ricinoleate, thermoplastic alkyd resins, linseed oil, blown rapeseed oil, soy bean oil, and the like.

The amount of any plasticizer employed should be just sufficient to prevent embrittlement in the closure after curing of the thermosetting resin but insufficient to render the cured resin sufficiently flexible or elastic to be removed from the bottle without tearing. Thus, the plasticizer should constitute less than 10% by weight of the composition.

The resin composition is extruded into tubing while the composition is in a fluid condition. The composition may be rendered fluid by heating until the composition becomes molten or by dissolving the resin in a suitable volatile organic solvent. The flowable composition thus produced is extruded into tubing by use of any suitable extrusion apparatus. The freshly extruded tubing is stretched transversely to enhance its shrinking characteristics, the stretching being carried out preferably, immediately after extrusion and while the composition is still in a plastic condition. If desired, the freshly extruded tubing may be heated to facilitate stretching. In general, the stretching should be sufficient to produce at least 10% shrinkage upon heating, but preferably the tubing is stretched from 30 to 50% of its initial diameter. The stretching has several important advantages, namely, it decreases the wall thickness and produces a tubing which is more lustrous and transparent; the stretching enhances the strength of the tubing transversely; and finally, the stretching increases tremendously the ability of the tubing to shrink upon heating. Unstretched seamless tubing, when heated, will show only a small and insignificant shrinkage which is insufficient for the use of unstretched tubing as bottle closures. To facilitate ease of application of the closure of the bottle, it is necessary that the closure have a diameter at least 10% greater than the maximum diameter of the bottle top; otherwise too much time is consumed in applying the closure. Accordingly, stretching the tubing transversely provides a means for regulating the diameter. Thus, from the same extrusion there may be produced stretched tubing of several different diameters.

After the tubing has been stretched, the stretched structure is fixed by cooling the tubing rapidly while maintaining it in a distended condition, preferably by inflating it with a fluid, such as water or gas. Thereafter the tubing may be flattened and severed transversely into closure bands.

While the invention is not limited to the use of any particular apparatus, suitable means for forming the tubing are shown in Figs. 1, 2 and 3 in which comminuted material is fed into the hopper 10 of an extrusion head 11. The plastic material is forced through the orifice 13 by means of a screw 14 and air is introduced inside of the extruded tubing 15 by means of a pipe 16 running through the center of the screw 14 and projecting through the central block 17 of the extrusion head. The screw may be rotated by means of a gear 18. By means of the air introduced through the pipe 16 into the interior of the extruded tubing 15, the tubing may be inflated and stretched transversely as it is extruded. The inflated stretched tubing is then passed, by means of a moving conveyor belt 19 through a cooling chamber 20 where the tubing is cooled to fix its stretched structure. The cooled tubing is then flattened by means of a pair of pressure rolls 21 after which it may be severed transversely into bands 22 by means of the knife 23, the bands being collected in the container 24. Alternatively, the flowable resin composition may be extruded into a fluid which is capable of coagulating or hardening the resin in the form of a tube. Referring to Fig. 3, the composition is passed into the extrusion head 11a by means of pipe 23 and extruded upward as a tube 15 into a body of fluid such as a stream of air which evaporates the solvent or a body of water which extracts the solvent. Using a chamber 24 divided into two sections, the lower section E is heated so that the tube is plastic when expanded by air or water circulated in the interior by means of the pipes 25 and 25a. The upper section F contains cold air or water to set the stretched structure of the tube. The tube is flattened by the rollers 21, dried, if necessary, and cut transversely into bands. The closures may be transparent or opaque and therefore the seamless tubing may be uniform in color and composition.

On the other hand, when it is desired to produce a so-called window band such as that illustrated in Fig. 4, an extrusion head is employed which has an orifice divided into quadrants. The details of construction of an orifice divided into quadrants for producing window bands is shown in U. S. Pat. 2,141,776, and as such means form no part of the present invention they will not be described in detail herein. To produce a window band, an opaque composition is extruded through opposite quadrants while a transparent composition is extruded through the other quadrants. Thus there is produced a closure as shown in Fig. 4 having two opposed opaque sections A and C and two opposed transparent sections B and D.

The shrinkable closure band in the pre-stretched condition is then applied dry over the top of a bottle 28 or other container as a secondary closure. Thereafter the closure is heated sufficiently to cause the closure to shrink.

Referring to Fig. 5, there is shown one embodiment of suitable means for heating the closure, such as a circular hood 26 having a recess in the bottom lined with electric heating coils 27. Conventional means not shown may be provided for disposing the hood over and around the closure as shown in Fig. 5. It is to be understood that the bottle closure may be heated while the bottle is still on the assembly machine, for example, while it is being rotated on a turntable for the purpose of applying a label to the bottle. Thus, the heating may be carried out simultaneously with one of the conventional steps of bottling so that no additional operation is involved. Preferably the temperature of the closure is raised to at least the softening point of the resin composition. With vinyl resins a temperature of from 100° to 130° C. is usuallly sufficient to cause shrinkage. In the now preferred embodiment a thermosetting resin in the thermoplastic condition is present in the closure composition and a latent curing catalyst for the resin is employed which is of such character that it will decompose at the temperature which causes the resin closure to shrink. Thus, the catalyst is activated during the shrinking whereupon the thermosetting resin is cured and hardened, thus producing a closure which after shrinking can not be stretched sufficiently to remove it without tearing. It is to be understood that the complete curing of the resin need not take place during the brief interval of heating the closure to shrink it. If the catalyst is active during the shrinking step, the curing of the resin will take place in the packing case during forming and stretching on the bottle.

By the way of illustrating, but not by way of limiting the invention, there will be given the following specific examples:

*Example I*

50 parts of polyvinyl butyral and 50 parts of a urea-formaldehyde butanol ether resin and 0.5 part of a salt of chloracetic acid are mixed, for example, by dissolving them in a common solvent such as butyl alcohol and then evaporating the solvent. The mixture is heated until molten and then extruded into a seamless tubing having an initial wall thickness of 0.12 of an inch, and the tubing expanded while hot by means of internal air pressure to a diameter 30% greater than the initial diameter. The tubing is then cooled rapidly while maintained in the expanded condition, after which the tubing is flattened and severed transversely into closure bands. The bands thus produced are placed in the dry pre-stretched condition on bottles as a secondary closure over a screw cap and shrunk thereon by heating the band to a temperature of 130° C., at which temperature the chloracetic salt develops an acid resulting in the curing or heat-hardening of the closure. After such heat-hardening, it is impossible to remove the closure from the bottle by soaking it in water or by heating it.

*Example II*

The process of Example I is repeated except that the resin composition comprises 75 parts polyvinyl acetate methylal, 25 parts melamine-formaldehyde resin in the fusible state and 0.5 part of a latent acid catalyst. The resulting composition is rendered plastic with a small amount of butyl alcohol and the plastic mass extruded into tubing and the solvent evaporated. The tubing is then stretched, cut, applied and cured as in Example I.

*Example III*

A dope was prepared consisting of 15.8 parts of polyvinyl butyral (hydroxyl 19%, butyral 80%, acetyl 1%) 4.2 parts octadecanediol-1:12-di-acetate, and 80 parts methanol. This dope was extruded into tubing and the solvent evaporated. Prior to the evaporation of all the solvent, the tubing was stretched 50% by internal expansion, and the stretched tubing heated to evaporate the remainder of the solvent and then rapidly cooled. The resulting tubing was tough, transparent, durable and exhibited a very high shrinkage when subjected to heat. The tubing was cut into bands, applied and heated as in Example I.

*Example IV*

A mixture was prepared comprising 50 parts of a copolymer of vinyl chloride and vinyl acetate, containing 85% vinyl chloride; 30 parts of a methyl methacrylate resin and 20 parts of a phenol-formaldehyde resin in the soluble, fusible state, 5 parts dibutyl sebacate and 0.5 part of a latent acid catalyst. The resulting composition was heated until sufficiently plastic to be extruded, and it was then formed into tubing and used according to Example I.

*Example V*

The process of Example II is repeated with the exception that the composition comprises a solution of 50 parts ethyl cellulose, 50 parts of a urea-formaldehyde butanol ether resin and 0.5 part of a latent acid catalyst dissolved in benzyl alcohol. The composition is extruded into tubing, the solvent evaporated and the tubing stretched, cut, used and cured as in Example I.

The container closures of the present invention are characterized by numerous advantages over hydrophilic closures heretofore known. Since the resin closures of the present invention are produced in a dry condition, they may be shipped dry, printed while dry, and applied in the dry condition, all of which decreases the expense of shipping and use. When the closure containing a thermosetting resin, which is cured after application of the closure, the stretching of the closure is irreversible, that is, the closure cannot be removed from the container without tearing it. It is also resistant to swelling in water, dilute alcohol solutions, and is unaffected by moderate temperatures which might be used in an attempt to remove the closure. The tubing is seamless and therefore uniform in thickness. It has a high lustre resulting from the stretching, and exhibits a substantial degree of shrinkage so that closures of given diameter may be used over bottle caps of widely different diameters. Accordingly it is not necessary with the resin closures of the present invention to produce the closure within such a narrow range of diameters as is the case with regenerated cellulose closures of the prior art.

Numerous changes can be made in the article and variations in the process without transcending the scope of the invention. Therefore the invention is not to be limited except by the scope of the appended claims.

Having described my invention, what I claim as new and desire to secure by Letters Patent is:

1. A shrinkable heat-hardenable container closure comprising a pre-stretched seamless tubing formed of a thermoplastic composition comprising from 25% to 75% by weight of a thermosetting resin in a thermoplastic state and the remainder essentially a thermoplastic organic film-forming material, said composition characterized by being hardenable to a nonthermoplastic solvent-insoluble state and shrinking at least 10% transversely when heated, whereby the closure is adapted to be shrunk and hardened in situ on a container, thereby being affixed irreversibly thereto.

2. A shrinkable heat-hardenable container closure in accordance with claim 1 in which the thermoplastic material is a polyvinyl resin.

3. A shrinkable heat-hardenable container closure according to claim 1 in which the thermosetting resin is a urea-formaldehyde resin.

4. A shrinkable heat-hardenable container closure according to claim 1 in which the thermoplastic material is a thermoplastic cellulose derivative.

5. As an article of manufacture, a shrinkable container closure comprising a short hollow section of a seamless, transversely stretched tubing formed of a thermoplastic resin composition comprising a thermosetting resin in a thermoplastic state, said closure being characterized by a condition of instability toward heat whereby it shrinks to a substantial extent transversely when heated.

6. As an article of manufacture, a shrinkable container closure comprising a short hollow section of a seamless, transversely stretched tubing formed from a mixture of a thermoplastic resin and a thermosetting resin in the thermoplastic state, said closure being characterized by a condition of instability toward heat whereby it shrinks to a substantial extent transversely when heated, the setting of the thermosetting resin upon heating being capable of rendering the closure resistant to softening when heated subsequently.

JOHN W. LITTLE.

REFERENCES CITED

The following references are of record in the file of this patent:

UNITED STATES PATENTS

| Number | Name | Date |
| --- | --- | --- |
| 1,370,800 | Egerton | Mar. 8, 1921 |
| 2,027,961 | Currie | Jan. 14, 1936 |
| 2,027,962 | Currie | Jan. 14, 1936 |
| 2,047,554 | Fischer | July 14, 1936 |
| 2,337,927 | Reichel et al. | Dec. 28, 1943 |

FOREIGN PATENTS

| Number | Country | Date |
| --- | --- | --- |
| 403,905 | Great Britain | Jan. 4, 1934 |
| 468,762 | Great Britain | July 12, 1937 |